United States Patent
Wang

(10) Patent No.: US 11,537,266 B2
(45) Date of Patent: Dec. 27, 2022

(54) APPLICATION INTERFACE DISPLAY METHOD, APPARATUS AND ELECTRONIC DEVICE

(71) Applicant: ALIBABA GROUP HOLDING LIMITED, Grand Cayman (KY)

(72) Inventor: Dong Wang, Beijing (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 178 days.

(21) Appl. No.: 16/727,265

(22) Filed: Dec. 26, 2019

(65) Prior Publication Data

US 2020/0133446 A1  Apr. 30, 2020

Related U.S. Application Data

(63) Continuation of application No. PCT/CN2018/092151, filed on Jun. 21, 2018.

(30) Foreign Application Priority Data

Jun. 29, 2017 (CN) .......................... 201710511148.5

(51) Int. Cl.
*G06F 3/0482* (2013.01)
*G06F 3/0484* (2022.01)

(52) U.S. Cl.
CPC .......... *G06F 3/0482* (2013.01); *G06F 3/0484* (2013.01)

(58) Field of Classification Search
CPC ................. G06F 3/0482; G06F 3/0484; G06F 2221/2111; G06F 9/451; G06F 3/0481; G06Q 10/02; G06Q 50/14
See application file for complete search history.

(56) References Cited

U.S. PATENT DOCUMENTS

| 8,195,203 B1 | 6/2012 | Tseng |
| 9,009,167 B2 | 4/2015 | Cerny |
| 9,377,319 B2 | 6/2016 | San Filippo et al. |

(Continued)

FOREIGN PATENT DOCUMENTS

| CN | 105487863 A | 4/2016 |
| CN | 105867862 A | 8/2016 |

(Continued)

OTHER PUBLICATIONS

Supplementary Search for Chinese Application No. 201710511148.5, dated Apr. 14, 2020.

(Continued)

*Primary Examiner* — Matthew Ell
*Assistant Examiner* — David Tan

(57) ABSTRACT

The application provides a method, apparatus, and electronic device for displaying application interfaces. The method may be implementable on a server. By the method, a current phase associated with a trip of a user may be determined, and interface configuration information corresponding to the current phase is determined for configuring a scenario-based interface of an application. Subsequently, the server sends the determined interface configuration information to the a client of the user, for the client to display the scenario-based interface of the application to the user according to the determined interface configuration information.

14 Claims, 5 Drawing Sheets

(56) References Cited

U.S. PATENT DOCUMENTS

| | | |
|---|---|---|
| 9,432,826 B2 | 8/2016 | Ickman et al. |
| 9,488,487 B2 | 11/2016 | Andersen |
| 9,536,197 B1 | 1/2017 | Penilla et al. |
| 9,855,947 B1 | 1/2018 | Penilla et al. |
| 10,223,134 B1 | 3/2019 | Penilla et al. |
| 2012/0185262 A1 | 7/2012 | Dalesandro et al. |
| 2013/0265154 A1* | 10/2013 | Tumayan .............. H04W 4/029 340/539.13 |
| 2013/0268886 A1 | 10/2013 | Sureshkumar |
| 2013/0345978 A1 | 12/2013 | Lush et al. |
| 2014/0256357 A1 | 9/2014 | Wang et al. |
| 2014/0282040 A1 | 9/2014 | Alfaro |
| 2015/0324751 A1 | 11/2015 | Orenstein et al. |
| 2016/0003637 A1* | 1/2016 | Andersen ............ H04L 12/1827 701/519 |
| 2016/0093006 A1 | 3/2016 | Sureshkumar |
| 2016/0292594 A1* | 10/2016 | Narayanan ............ G06Q 50/14 |
| 2017/0154389 A1 | 6/2017 | Bashvitz et al. |
| 2017/0318425 A1* | 11/2017 | Dai ........................ H04L 67/18 |

FOREIGN PATENT DOCUMENTS

| | | |
|---|---|---|
| CN | 105867909 A | 8/2016 |
| CN | 106209935 A | 12/2016 |
| CN | 106406892 A | 2/2017 |
| CN | 106603595 A | 4/2017 |
| CN | 106843889 A | 6/2017 |
| CN | 106897382 A | 6/2017 |
| CN | 105144144 B | 4/2018 |
| JP | 6017685 B2 | 11/2016 |
| KR | 20170129689 A | 11/2017 |
| KR | 20180001584 A | 1/2018 |
| TW | I572849 B | 3/2017 |
| WO | 2014151153 A2 | 9/2014 |

OTHER PUBLICATIONS

First Search Report for Chinese Application No. 201710511148.5, dated Oct. 24, 2019, 1 page.

Written Opinion of the International Searching Authority and International Search Report for International Application No. PCT/CN2018/092151, dated Sep. 25, 2018, 12 pages.

International Preliminary Report on Patentability for International Application No. PCT/CN2018/092151, dated Jan. 9, 2020, 9 pages.

* cited by examiner

APPLICATION INTERFACE DISPLAY METHOD, APPARATUS AND ELECTRONIC DEVICE

CROSS-REFERENCE TO RELATED APPLICATIONS

The application is a continuation application of International Patent Application No. PCT/CN2018/092151, filed on Jun. 21, 2018, and entitled "APPLICATION INTERFACE DISPLAY METHOD, APPARATUS AND ELECTRONIC DEVICE." The PCT application is based on and claims priority to Chinese Patent Application No. 201710511148.5 filed on Jun. 29, 2017. All of the above-referenced applications are incorporated herein by reference in their entirety.

TECHNICAL FIELD

The application relates to the field of application ("APP") technologies, and in particular to a method and apparatus for displaying an application interface. Moreover, the application relates to an electronic device for displaying an application interface.

BACKGROUND

While preparing for a trip, a user may search and analyze a large amount of information through travel applications. The user may also write some travel articles by using the applications after the trip. The travel applications can conveniently provide a large amount of information for the user's reference.

However, various functions including hidden functions of existing travel applications are fixed. At any time when a user opens such an application, the first interface or the following interface always provides the same functions and services. Therefore, the user needs to spend time to search for a corresponding function in the application according to the user's current state and thus use the corresponding function. To a regular user, however, it is sometimes difficult to find a desired function due to the lack of travel knowledge. It is even more difficult when the user has already started traveling. As a result, the efficiency of use and query of the applications by the user is low. Therefore, the user experience with the display of interfaces and functions of the existing applications is poor.

SUMMARY

To resolve the above problems, the application provides a method for displaying an application interface. Moreover, the application provides an apparatus for displaying an application interface. The application further provides an electronic device for displaying an application interface.

According to a first aspect of the application, a computer-implemented method for displaying an application interface is provided. The computer-implemented method may comprise: determining a current phase associated with a trip of a user; determining interface configuration information corresponding to the current phase for configuring a scenario-based interface of an application; and sending the determined interface configuration information to a client of the user for the client to display the scenario-based interface of the application to the user according to the determined interface configuration information.

In some embodiments, before the determining a current phase associated with a trip of a user, the method comprises: collecting information of the user's activities with respect to the application and associated with the trip of the user; and analyzing the collected information to determine the current phase associated with the trip of the user.

In some embodiments, the collected information of the user's activities with respect to the application and associated with the user's trip comprises one or more pieces of the following information: log information, user's location information, and order information, or a combination thereof.

In some embodiments, the analyzing the collected information to determine the current phase associated with the trip of the user comprises: identifying travel state information of the user according to the collected information; comparing the travel state information with a set of preset phases to determine whether the travel state information matches a phase comprised in the set of preset phases; and in response to determining that the travel state information matches a phase comprised in the set of phases, determining the matched phase to be the current phase associated with the trip of the user.

In some embodiments, in response to determining that the travel state information does not match any phase comprised in the set of phases, sending an instruction of displaying a default interface of the application to the client, causing the application at the client to display the default interface according to the instruction.

In some embodiments, the identifying travel state information of the user according to the collected information comprises: comparing the number of times of executing an operation related to the trip by the user on the application with a threshold value; and in response to that the number of times of executing the operation related to the trip by the user on the application exceeds the threshold value, identifying information of the operation as the travel state information of the user.

In some embodiments, the determining interface configuration information corresponding to the current phase for configuring a scenario-based interface of an application comprises: pre-setting a plurality of phases of a trip; setting corresponding interface configuration information of the application for each of the plurality of phases; establishing a matching relationship between the each of the plurality of phases and the corresponding interface configuration information of the application; and determining, based on the matching relationship, interface configuration information of the application matching the current phase to be the interface configuration information corresponding to the current phase.

In some embodiments, the interface configuration information comprises interface display configuration information for providing a basis for interface information displayed on the scenario-based interface and interface function configuration information for providing a basis for functional modules that the scenario-based interface has.

In some embodiments, the establishing a matching relationship between the each of the plurality of phases and the corresponding interface configuration information of the application comprises: establishing the matching relationship between the each of the plurality of phases and the corresponding interface configuration information by means of a scenario calling engine; and the determining, based on the matching relationship, interface configuration information of the application matching the current phase to be the interface configuration information corresponding to the current phase comprises: using the scenario calling engine to obtain the matching relationship between the each of the plurality of phases and the corresponding interface configuration information of the application; and determining, according to the matching relationship, interface configuration information of the application matching the current phase.

In some embodiments, the plurality of pre-set phases of a trip comprises: before the trip, during the trip, or after the trip; and each of the plurality of pre-set phases of the trip comprises a plurality of sub-phases.

According to a second aspect of the application, another computer-implemented method for displaying an application interface is provided. The computer-implemented method may comprise: collecting information of the user's activities with respect to an application and associated with a trip of the user; analyzing the collected information to determine a current phase associated with the trip of the user; determining interface configuration information corresponding to the current phase for configuring a scenario-based interface of the application; and displaying, according to the determined interface configuration information, the scenario-based interface of the application.

According to a third aspect of the application, an apparatus for displaying an application interface is provided. The apparatus may comprise: one or more processors and one or more non-transitory computer-readable memories coupled to the one or more processors and configured with instructions executable by the one or more processors to cause the apparatus to perform operations comprising: determining a current phase associated with a trip of a user; determining interface configuration information corresponding to the current phase for configuring a scenario-based interface of an application; and sending the determined interface configuration information to a client of the user for the client to display the scenario-based interface of the application to the user according to the determined interface configuration information.

According to a fourth aspect, the application provides an electronic device. The electronic device may comprise: a processor and a memory. The memory stores software programs for application interface display, and the software programs, when executed by the processor, cause the electronic device to perform the following operations: determining a current phase associated with a trip of a user; determining interface configuration information corresponding to the current phase for configuring a scenario-based interface of an application; and sending the determined interface configuration information to a client of the user for the client to display the scenario-based interface of the application to the user according to the determined interface configuration information.

According to a fifth aspect, the application provides an electronic device. The electronic device may comprise: a processor and a memory. The memory stores software programs for application interface display, and the software programs, when executed by the processor, cause the electronic device to perform the following operations: collecting information of the user's activities with respect to an application and associated with a trip of the user; analyzing the collected information to determine a current phase associated with the trip of the user; determining interface configuration information corresponding to the current phase for configuring a scenario-based interface of the application; and displaying, according to the determined interface configuration information, the scenario-based interface of the application.

According to a sixth aspect, the application provides a non-transitory computer-readable storage medium configured with instructions executable by one or more processors to cause the one or more processors to perform operations comprising: determining a current phase associated with a trip of a user; determining interface configuration information corresponding to the current phase for configuring a scenario-based interface of an application; and sending the determined interface configuration information to a client of the user for the client to display the scenario-based interface of the application to the user according to the determined interface configuration information.

According to a seventh aspect, the application provides a non-transitory computer-readable storage medium configured with instructions executable by one or more processors to cause the one or more processors to perform operations comprising: collecting information of the user's activities with respect to an application and associated with a trip of the user; analyzing the collected information to determine a current phase associated with the trip of the user; determining interface configuration information corresponding to the current phase for configuring a scenario-based interface of the application; and displaying, according to the determined interface configuration information, the scenario-based interface of the application.

Compared with the existing technologies, the embodiments of the method, apparatus, electronic device, and non-transitory computer-readable storage medium provided by the application have the following advantages. A current phase of a user's trip may be determined in advance, and then interface configuration information matching the current phase of the user's trip is obtained. Subsequently, the server may send the interface configuration information to the client, so that the client may use the interface configuration information to configure a scenario-based user interface of an application to be suitable for the scenario and functions desired by the user at the time (e.g., upon the user opening the application). The interface configuration information may vary according to different phases of the trip during which a user is. Since functions desired by the user and operations executed by the user may be different for different phases of the trip, the embodiments of the application can ensure that the interface configuration information sent by the server to the client is determined according to a current phase in which the user is and can present to the user a scenario-based interface including scenario-based functions of the application that are the most suitable for the current phase.

In summary, the embodiments of the application can resolve the problems of requiring a user to select functions of an application in different phases of a trip, avoiding inquiries in the application made by the user on his/her own, saving a great amount of time cost for the user, improving application use and inquiry efficiencies of the user, and greatly improving the user experience with the application.

DETAILED DESCRIPTION

The application provides a method for displaying an application interface. The method may be used in applications for displaying different scenarios or functions to users. According to use and feedback of users, some travel applications may display different scenarios or functions. Therefore, the embodiments may be described by taking as an example an application that has various travel scenarios and is divided into phases according to travel states. A user may use a travel application to check or order products as needed or search for information regarding a travel destination. In different phases of the trip, operations with respect to different scenarios and functions may be conducted by the user in the travel application. Therefore, the embodiments described hereinafter can resolve the problems of requiring a user to select functions of an application in different phases of a trip, avoiding inquiries in the application made by the user on his/her own, saving a great amount of time cost for the user, improving application use and inquiry efficiencies of the user, and greatly improving the user experience with the application.

The methods according to the application will be introduced and described in detail below through description of embodiments.

Figure 1:
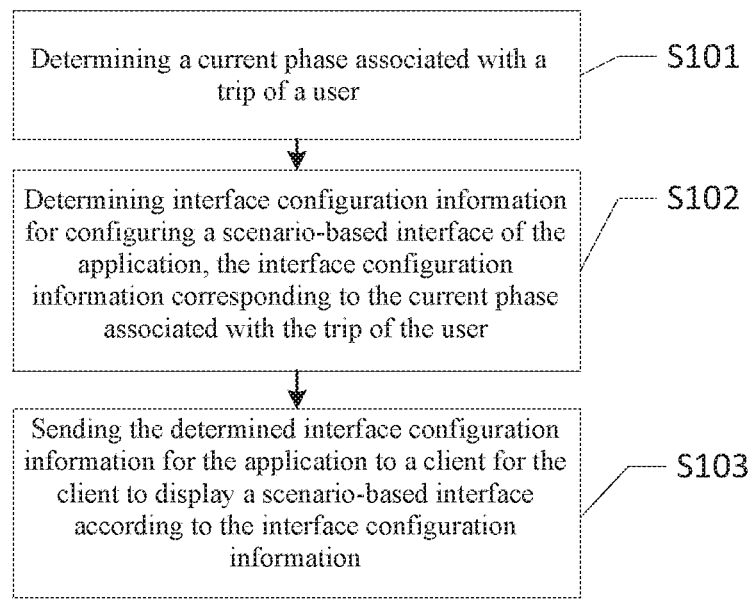
FIG. 1 is a flow chart of a method for displaying an application interface according to some embodiments of the application.

FIG. 1 is a flow chart of a method for displaying an application interface according to some embodiments of the application. The method may comprise steps executed by a server. Referring to FIG. 1, the method according to the embodiments comprises the following steps S101-S103.

Step S101, determining a current phase associated with a trip of a user.

When a user travels, the user may need different information according to different phases of the trip. For example, in a phase before the trip, the user may need to check information of the travel destination or the like, and thus the user may desire an interface of an application having a function of booking an air ticket or train ticket for the determined destination. The above information may not be useful anymore during the trip, while information related to attractions at the destination or other similar information may be needed. Therefore, information desired by the user may be different in different phases of the trip. Accordingly, in this step, a current phase associated with the trip of the user (also referred to as a phase of the trip in which the user currently is) may be determined, so that a personalized user interface may be customized according to the current phase of the trip and is obtained according to the current phase in a subsequent step.

Since the current phase of the trip of the user may be important for the subsequent steps, determining the current phase of the user may be an important step. In some embodiments, before the current phase of the user is determined, the following steps may be executed first: collecting information of the user's activities with respect to the application and associated with the user's trip; and analyzing the collected information to determine the current phase associated with the trip of the user.

First, the step of collecting information of the user's activities with respect to the application and associated with the user's trip is described in detail below.

In some embodiments, this step may be a process conducted by a server for collecting data (such as data of the user's activities) from a client. The server may perform data analysis according to the operations of the user on the application. Therefore, the server may collect information capable of reflecting the user's travel from the application stored in the client.

For example, the collected information of the user's activities with respect to the application and associated with the user's trip may comprise one or more pieces of the following information: log information, user's location information, and order information, or a combination thereof.

The log information may refer to some data and information recorded at the backend when the user uses the application to perform relevant operations. For example, when the user searches for a travel destination, the search operation and the like operations may all be recorded as log information and stored on the client, and the server may collect the above information stored at the client. In some embodiments, after the user downloads the application, the user may conduct some operations on the application, and the use record of the operations may be reported to the server as the log information. For example, the user may conduct operations related to travel, e.g., inquires and purchases related to the trip, on the application installed on the client, and the server may collect information of the operations.

The user's location information may be determined according to some function of the user's mobile terminal and indicate the location where the user is. The user's location may be used as an important reference for determining the phase associated with the trip of the user. In addition, the order information may be a relatively important information in the process of the user's trip. The order information, including such as whether the user has purchased an air ticket and whether the user has reserved a hotel room, can also be used as an important basis for determining the phase associated with the trip of the user.

Moreover, when the collected information is the log information, the collecting information of the user's activities with respect to the application and associated with the trip of the user comprises: collecting records of relevant operations executed by the user on the application and using the records as the log information. In some embodiments, the records of relevant operations executed by the user on the application comprises one or more pieces of the following information: inquiry information, search information, and transaction information of the user on the application, or a combination thereof.

In some embodiments, the log information may be divided according to types (air ticket, hotel, etc.) and/or sub-types (search, transaction, etc.) of the logs. For example, a program may be used to collect the users' logs from all machines, categorize the logs according to users, and divide the log information of a user based on the types and/or the sub-types.

Some examples of the information of the user's activities with respect to the application and associated with the trip of the user has been described above. To determine the phase associated with the trip of the user, the obtained information may be further analyzed. In some embodiments, after the information of the user's activities with respect to the application and associated with the trip of the user is collected, the step of analyzing the collected information to determine the current phase associated with the trip of the user is executed.

A user's trip may be divided into multiple phases. For example, the multiple phases of a trip may include a decision-making phase, a booking phase, a travel phase, a feedback phase, and the like. During the user's decision-making phase, the user determine where to go, how to get there, and what to play. During the booking phase, the user may determine what tour elements (air tickets, hotels, admission tickets, and the like) to buy. During the travel phase, the user may determine what services and attentions are needed during the trip. During the feedback phase, the user may provide some reviews and travel articles after the trip.

In some embodiments, the log information, the user's location information, and/or order information formed according to the user's operation and use records may be analyzed to identify a current phase associated with the trip of the user (such as a decision-making phase, a booking phase, a travel phase, a feedback phase, and the like, as described above).

For example, the analyzing the collected information to the current phase associated with the trip of the user comprises the following steps: identifying travel state information of the user according to the collected information; comparing the travel state information with a set of preset phases to determine whether the travel state information matches a phase comprised in the set of preset phases; and if yes, determining the matched phase to be the current phase associated with the trip of the user.

Multiple phases of a trip may be preset. For example, the multiple phases may include: before the trip, during the trip, or after the trip. Each of the phases may be further divided into multiple sub-phases. For example, the phase of "before the trip" may be further divided into sub-phases of no idea, having ideas, selecting, and the like.

In the phase of "before the trip," users select a destination and products. Therefore, the application interface may display good destinations and products recommended to the users who are in the phase of "before the trip." In the phase of "during the trip," i.e., when a user is travelling, the application interface may display information and services of the destination during the trip. In the phase of "after the travel," the interface may guide users to provide reviews and the like. Therefore, the interface may be configured with corresponding data and services according to different phases of the user's trip.

In some embodiments, the log information is analyzed, and the phase associated with the trip of the user is determined according to a result of the analysis. For example, the identifying travel state information of the user according to the collected information comprises: pre-setting a threshold value for the number of times of executing a relevant operation the user on the application; comparing the collected numbers of times of executing relevant operations by the user on the application and the preset threshold value; and identifying information of the operation that has been executed for more than the threshold value of the number of times as the travel state information of the user.

For example, when the phase associated with the trip of the user is determined according to the log information of the user, it is likely that the user is in the decision-making phase before the trip if the user keeps searching within a period for information related to some places, such as Beijing-Hong Kong. The server may then determine whether the number of the searches by the user exceeds a preset threshold value for the number of times of executing this type of operation (such as searching for information of places) according to the collected information. If the number of the searches exceeds the preset threshold value (such as 5, 10, 20, etc.), it may be determined that the user is in the phase before the trip. In subsequent steps, further according to the determined phase of the user before the trip, the application interface of the user can be configured with some information regarding air tickets from Beijing to Hong Kong or some Hong Kong-related data and information can be displayed on the user interface.

By identifying the phase of the user in this manner, erroneous determination of the phase of the user caused by replying on a single operation record or a couple of operation records of the user can be avoided, and the problem of causing inconvenience to the user can be solved.

In some embodiments, if it is determined that the travel state information does not match any phase in the set of preset phases, then the server may send an instruction to the client for displaying a default interface on the application, causing the client to display a default interface on the application based on the instruction.

For example, when the server can determine the current phase of the trip of the user according to the collected log information, the server can determine subsequent interface configuration information. However, if the server cannot identify the current phase of the trip of the user, for example, when the user has just downloaded the application and has not conducted any operation, it may be impossible for the server to determine the travel state information of the user, or for example, when the user has conducted travel-related operations for a limited number of times and within a limited period of time, it may also be impossible for the server to analyze and determine the phase of the user according to the limited log information of the user. In such a circumstance, the server may send an operation instruction of using the default interface to the client, so that the application at the client displays the default interface.

Accordingly, the methods in the embodiments can automatically determine the current phase associated with the trip of the user, and then configure the interface page of the application according to functions and services that the user may desire to achieve during this current phase to obtain a scenario-based interface of the application, thereby greatly improving the user experience.

Referring to FIG. 1, in step S102, interface configuration information is determined for configuring a scenario-based interface of the application, and the interface configuration information corresponds to the current phase associated with the trip of the user.

In some embodiments, in the step S102, the interface configuration information is generated according to the phase associated with the trip of the user.

The interface configuration information comprises interface display configuration information for providing a basis for interface information displayed on the scenario-based user interface and interface function configuration information for providing a basis for functional modules that the scenario-based user interface has. According to the interface configuration information, a corresponding interface template and interface functions may be provided for the user.

The interface configuration information corresponds to the current phase associated with the trip of the user. In some embodiments, when different users are in the same phase, the interface configuration information may be the same. However, if personalized settings of functional interfaces are added, the interface configuration information may be different for different users in the same phase. Whether the interface configuration information is the same depends on various functional interfaces on a page.

In some embodiments, determining interface configuration information corresponding to the current phase for configuring a scenario-based interface of an application comprises: pre-setting a plurality of phases of a trip; setting corresponding interface configuration information of the application for each of the plurality of phases; establishing a matching relationship between the each of the plurality of phases and the corresponding interface configuration information of the application; and determining, based on the matching relationship, interface configuration information of the application matching the current phase to be the interface configuration information corresponding to the current phase.

The pre-set plurality of phases of a trip may comprise: before the trip, during the trip, or after the trip. Each phase of a trip may be further divided into a plurality of sub-phases.

In some embodiments, establishing a matching relationship between the each of the plurality of phases and the corresponding interface configuration information of the application comprises: establishing a matching relationship between the each of the plurality of phases and the corresponding interface configuration information by means of a scenario calling engine.

In some embodiments, determining, based on the matching relationship, interface configuration information of the application matching the current phase to be the interface configuration information corresponding to the current phase comprises: parsing the scenario calling engine to obtain the matching relationship between the each of the plurality of phases and the corresponding interface configuration information of the application; and determining, according to the matching relationship, interface configuration information of the application matching the current phase.

For example, various interface configuration information corresponding to various phases may be displayed in the following Table 1.

TABLE 1

| The phase of a trip | Interface configuration-related information |
|---|---|
| before the trip | Providing selections of destinations and/or products |
| during the trip | Providing data and services regarding a destination |
| after the trip | Guiding users to provide reviews |

For example, air tickets and hotels may be recommended to the user in the phase of "before the trip." When the user has purchased a product associated with a destination, other products associated with the same destination may be recommended to the user, and products and information regarding the destination may be displayed to the user during the trip. Therefore, by setting corresponding interface configuration information for different phases of the trip, the user can be provided different data and information on the user interface when the user is in different phases of the trip.

Referring to FIG. 1, in step S103, the determined interface configuration information for the application is sent to a client of the user for the client to display the scenario-based interface of the application according to the determined interface configuration information.

This step S103 is a process of sending the determined interface configuration information to the client of the user, and the client may subsequently conduct operations according to the interface configuration information, causing the user interface of the application to display the scenario-based interface.

After sending the determined interface configuration information for the application to the client of the user, the method may further comprise: receiving, by the client, the interface configuration information for the application; parsing the interface configuration information to obtain scenario-based function information of the interface; and displaying the scenario-based interface according to the scenario-based function information on the application interface of the client.

After displaying the scenario-based interface according to the scenario-based function information on an application interface of a client, the method may further comprise: receiving an operation of the user with respect to the scenario-based interface; and displaying corresponding functions and information according to the operation of the user.

Therefore, through the methods according to the embodiments, a phase of trip of the user is determined mainly according to the historical activities of the user with respect to the application, and then based on the interface template and interface functions configured for the phase of the trip, scenario-based functions of the interface are displayed to the user.

Figure 2:
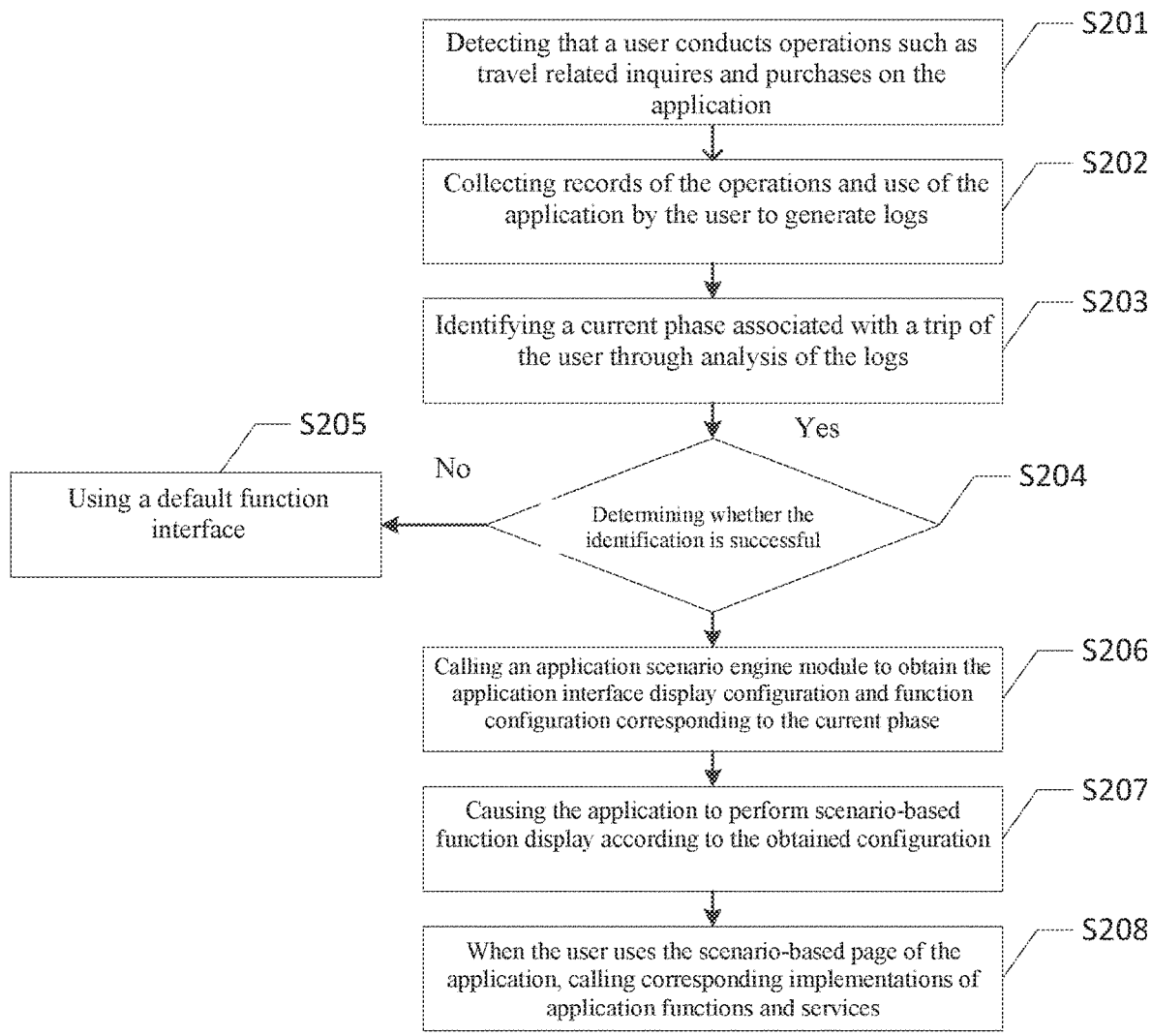
FIG. 2 is a flow chart of a method for displaying an application interface according to some embodiments of the application.

Moreover, the methods according to the embodiments will be introduced and described below through detailed steps. FIG. 2 is a flow chart of a method for displaying an application interface according to some embodiments of the application. In some embodiments, the method is implemented on a server, a client, or by cooperation of both the server and the client. Referring to FIG. 2, the method may comprise the following steps S201-S208.

Step S201, it is detected that a user conducts operations such as travel related inquires and purchases on the application; S202, records of the operations and use of the application by the user are collected to generate logs; S203, a current phase associated with a trip of the user is identified through analysis of the logs; S204, whether the identification is successful is determined; if the identification is not successful, S205 is executed and a default function interface is used; if the identification is successful, S206 is executed and an application scenario engine module is called to obtain the application interface display configuration and function configuration corresponding to the current phase; S207, the application is caused to perform scenario-based function display according to the obtained configuration; and S208, when the user uses the scenario-based page of the application, corresponding implementations of application functions and services are called.

With the above method according to the application, a phase of the user's trip may be determined in advance, and then interface configuration information matching the phase of the user's trip may be identified. Subsequently, the server sends the interface configuration information to the client, so that the client uses the interface configuration information to configure a user interface to be suitable for the scenario and functions desired by the user at the present phase of the trip. The interface configuration information varies according to different phases that a user is in. Since functions desired by the user and operations executed by the user are different for different phases of the trip, this method can ensure that the interface configuration information sent by the server to the client is determined according to a current phase that the user is in and can present to the user scenario-based functions of the application that are most suitable for the current phase.

In summary, the embodiments of the method can resolve the problems of requiring a user to select functions of an application in different phases of a trip, avoiding inquiries in the application made by the user on his/her own, saving a great amount of time cost for the user, improving application use and inquiry efficiencies of the user, and greatly improving the user experience with the application.

Figure 3:
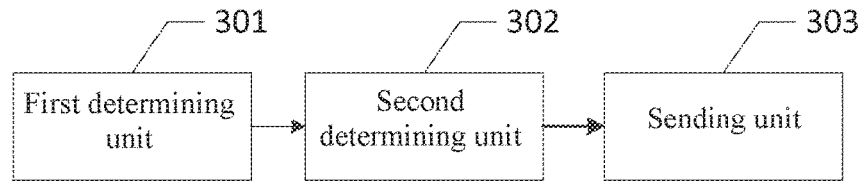
FIG. 3 is a schematic diagram of an apparatus for displaying an application interface according to some embodiments of the application.

Based on the above method according to the embodiments of the application, embodiments of the application further provide an application interface display apparatus. FIG. 3 is a schematic diagram of an apparatus for displaying an application interface according to some embodiments of the application. Since the apparatus embodiments are substantially similar to the method embodiments, the apparatus embodiments are described below briefly, and portions of the method embodiments may be referenced for relevant parts. The apparatus embodiment described below is merely illustrative.

The embodiments further provides an apparatus that causes the application to display scenario-based interfaces, the apparatus comprising: a first determining unit 301 configured to determine a current phase associated with a trip of a user; a second determining unit 302 configured to determine interface configuration information corresponding to the current phase for configuring a scenario-based interface of an application; and a sending unit 303 configured to send the determined interface configuration information to a client for the client to display the scenario-based interface of the application according to the determined interface configuration information.

In some embodiments, the apparatus further comprises: a collecting unit configured to collect, before the determining the current phase associated with the trip of the user, information of the user's activities with respect to and associated with the user's trip; and an analyzing unit configured to analyze the collected information to determine the current phase associated with the trip of the user.

In some embodiments, the analyzing unit comprises: an identifying sub-unit configured to identify travel state information of the user according to the collected information; a determining sub-unit configured to compare the travel state information with a set of preset phases to determine whether the travel state information matches a phase comprised in the set of preset phases; and a setting sub-unit configured to set, if a determining result of the determining sub-unit is yes, the matching phase to be the current phase associated with the trip of the user.

In some embodiments, the second determining unit comprises: a pre-setting sub-unit configured to pre-set a plurality of phases of a trip; a relationship establishing sub-unit configured to set corresponding interface configuration information for each different phase, and establish a matching relationship between each phase and the corresponding interface configuration information; and an information determining sub-unit configured to determine, according to the determined current phase, interface configuration information of the application matching the current phase based on the matching relationship.

Figure 4:
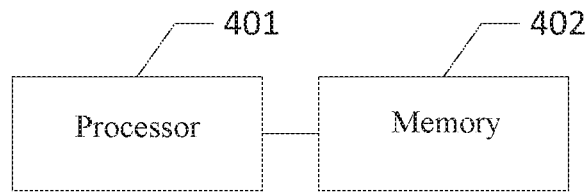
FIG. 4 is a schematic structural diagram of an electronic device for displaying an application interface according to some embodiments of the application.

Corresponding to the method according to the embodiments of the application, embodiments of the application provide an electronic device. FIG. 4 is a schematic structural diagram of an electronic device for displaying an application interface according to some embodiments of the application. Referring to FIG. 4, the electronic device comprises: a processor 401 and a memory 402. The memory 402 stores software programs for displaying an application interface, and the software programs, when read and executed by the processor, cause the processor to execute the following operations: determining a current phase associated with a trip of a user; determining interface configuration information corresponding to the current phase for configuring a scenario-based interface of an application; and sending the determined interface configuration information to a client of the user for the client to display the scenario-based interface of the application to the user according to the determined interface configuration information. In some embodiments, the memory 402 may be a non-transitory computer-readable storage medium configured with instructions executable by the processor 401 to cause the processor to perform the above-described operations for displaying an application interface to a user.

Figure 5:
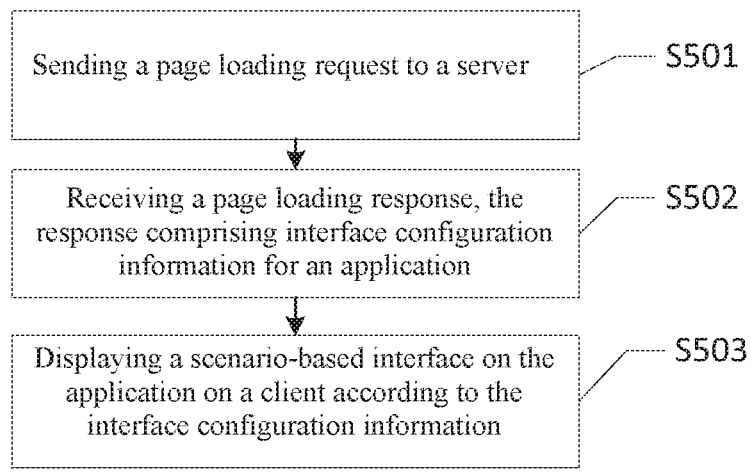
FIG. 5 is a flow chart of a method for displaying an application interface according to some embodiments of the application.

Embodiments of the application provide a method for displaying an application interface, which is applicable on a client. FIG. 5 is a flow chart of a method for displaying an application interface according to some embodiments of the application. Referring to FIG. 5, the method comprises the following steps: Step S501, sending a page loading request to a server; Step S502, receiving a page loading response, the response comprising interface configuration information for an application; and Step S503, displaying a scenario-based interface on the application on a client according to the interface configuration information for the application.

In some embodiments, displaying a scenario-based interface on the application on a client according to the interface configuration information for the application comprises: analyzing the interface configuration information to obtain scenario-based function information of the interface; and displaying the scenario-based interface on the application on the client according to the scenario-based function information.

In some embodiments, after displaying a scenario-based interface on the application on the client according to the interface configuration information, the method comprises: detecting an operation of the user with respect to the scenario-based interface; and displaying corresponding functions and information according to the operation.

The method embodiments applicable on the client correspond to the method embodiments applicable at the server.

In some embodiments, the client sends a request to the server, and the server obtains corresponding interface configuration information according to the request. The interface configuration information is obtained by the server through analysis. Then, the server sends the obtained interface configuration information to the client. According to the received interface configuration information, the client configures corresponding scenarios and functions for the application interface, and the interface displayed to the user is a scenario-based interface to facilitate inquiries and use of the user.

After the corresponding scenario-based interface is displayed on the application at the client, corresponding functions may be triggered according to further operations of the user. In other words, the user may use the scenario-based interface page of the application to call the corresponding functions and services of the application.

How to obtain corresponding interface configuration information and how to collect information from the client by the server have been introduced and described in detail in the method embodiments applicable at the server, and thus will not be elaborated in the present method embodiments.

Accordingly, the method embodiments of the application can resolve the problems of requiring a user to select functions of an application in different phases of a trip, avoiding inquiries in the application made by the user on his/her own, saving a great amount of time cost for the user, improving application use and inquiry efficiencies of the user, and greatly improving the user experience with the application.

Figure 6:
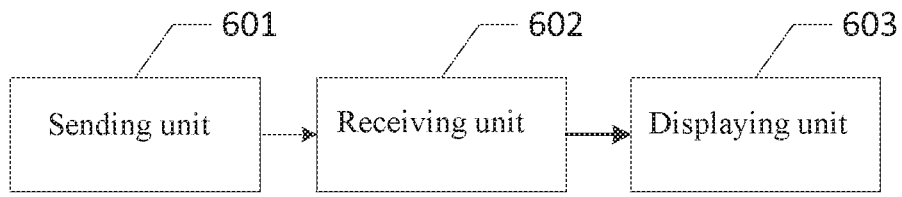
FIG. 6 is a schematic diagram of an apparatus for displaying an application interface according to some embodiments of the application.

Corresponding to the method embodiments applicable at the client, embodiments of the application further provide an apparatus for application interface display. FIG. 6 is a schematic diagram of an apparatus for displaying an application interface according to some embodiments of the application. Since the apparatus embodiments are substantially similar to the method embodiments, the apparatus embodiments are described below briefly, and portions of the method embodiments may be referenced for relevant parts. The apparatus embodiments described below are merely illustrative.

The apparatus for displaying an application interface may comprise: a sending unit 601 configured to send a page loading request to a server; a receiving unit 602 configured to receive a page loading response, the response comprising interface configuration information for an application; and a displaying unit 603 configured to display a scenario-based interface on the application on a client according to the interface configuration information for the application.

Figure 7:
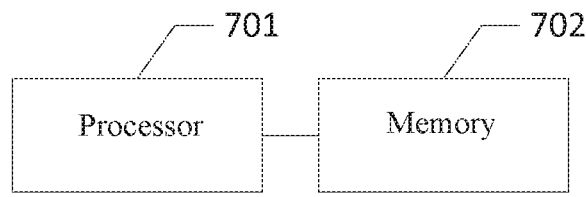
FIG. 7 is a schematic structural diagram of an electronic device for displaying an application interface according to some embodiments of the application.

Corresponding to the method embodiments applicable at a client, embodiments of the application provide an electronic device. FIG. 7 is a schematic structural diagram of an electronic device for displaying an application interface according to some embodiments of the application. Referring to FIG. 7, the electronic device comprises: a processor 701 and a memory 702. The memory 702 stores software programs for application interface display, and the software programs, when read and executed by the processor, cause the processor to execute the following operations: sending a page loading request to a server; receiving a page loading response, the response comprising interface configuration information for an application; and displaying a scenario-based interface on the application on a client according to the interface configuration information for the application.

Figure 8:
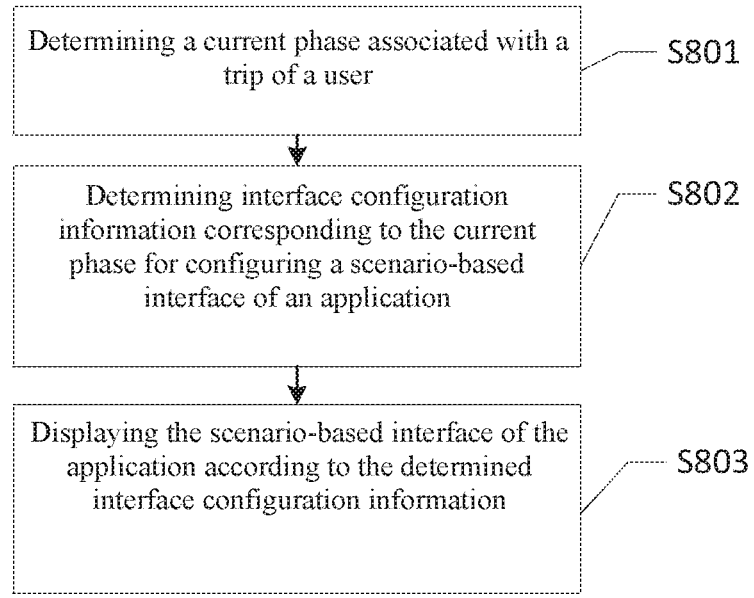
FIG. 8 is a flow chart of a method for displaying an application interface according to some embodiments of the application.

Embodiments of the application provide another method for displaying an application interface, which is also applicable at a client. For example, FIG. 8 is a flow chart of a method for displaying an application interface according to some embodiments of the application. Referring to FIG. 8, the method comprises the following steps: Step S801, determining a current phase associated with a trip of a user; Step S802, determining interface configuration information corresponding to the current phase for configuring a scenario-based interface of an application; and Step S803, displaying the scenario-based interface of the application according to the determined interface configuration information.

In some embodiments, before the determining a current phase associated with a trip of a user, the method comprises: collecting information of the user's activities with respect to the application and associated with the trip of the user; and analyzing the collected information to determine a current phase associated with the trip of the user.

The step of determining a current phase associated with a trip of a user and the step of determining interface configuration information corresponding to the current phase for configuring a scenario-based interface of an application are both executed on the client, while the above steps in the some other method embodiments may be executed on the server. By executing the above two steps on the client, the following advantage can be achieved: the interaction between the client and the server can be reduced, and all steps are executed on the client, leading to a fast response speed.

Figure 9:
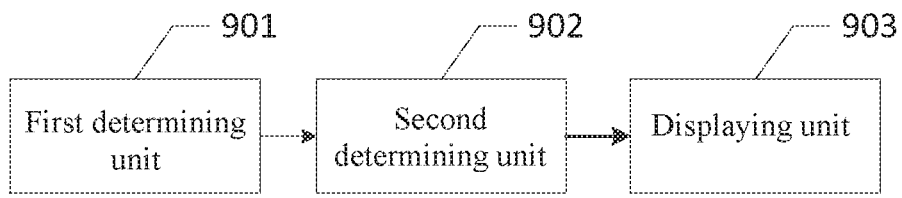
FIG. 9 is a schematic diagram of an apparatus for displaying an application interface according to some embodiments of the application.

Based on the method embodiments, embodiments of the application correspondingly provide an apparatus for displaying an application interface. FIG. 9 is a schematic diagram of an apparatus for displaying an application interface according to some embodiments of the application. Referring to FIG. 9, the apparatus comprises: a first determining unit 901 configured to determine a current phase associated with a trip of a user; a second determining unit 902 configured to determine interface configuration information corresponding to the current phase for configuring a scenario-based interface of an application; and a displaying unit 903 configured to display the scenario-based interface of the application according to the determined interface configuration information.

Figure 10:
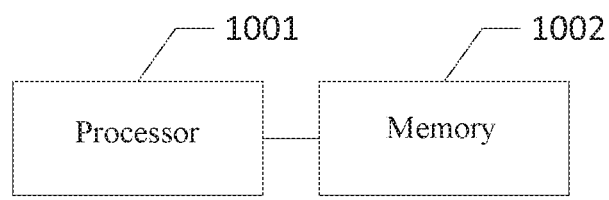
FIG. 10 is a schematic structural diagram of an electronic device for displaying an application interface according to some embodiments of the application.

Moreover, based on the method embodiments, embodiments of the application provide an electronic device. FIG. 10 is a schematic structural diagram of an electronic device for displaying an application interface according to some embodiments of the application. Referring to FIG. 10, the apparatus comprises: a processor 1001 and a memory 1002. The memory 1002 stores software programs for application interface display, and the software programs, when read and executed by the processor, cause the processor to execute the following operations: determining a current phase associated with a trip of a user; determining interface configuration information corresponding to the current phase for configuring a scenario-based interface of an application; and displaying the scenario-based interface of the application according to the determined interface configuration information.

Figure 11:
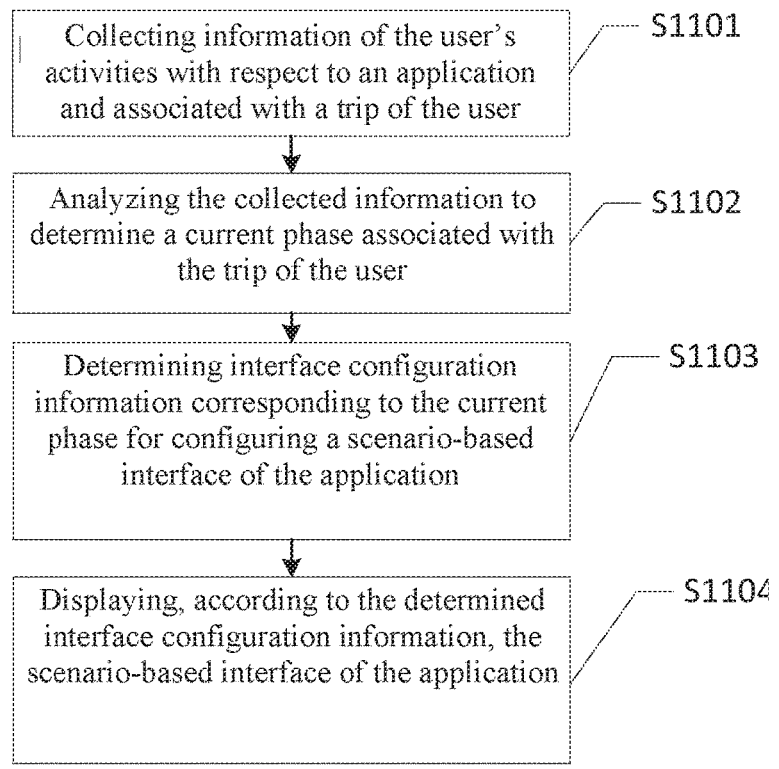
FIG. 11 is a flow chart of a method for displaying an application interface according to some embodiments of the application.

Moreover, to provide more details for the method embodiments, embodiments of the application provide another method for displaying an application interface, which includes more details. FIG. 11 is a flow chart of a method for displaying an application interface according to some embodiments of the application. Referring to FIG. 11, the method comprises the following steps: Step S1101, collecting information of the user's activities with respect to an application and associated with a trip of the user; Step S1102, analyzing the collected information to determine a current phase associated with the trip of the user; Step S1103, determining interface configuration information corresponding to the current phase for configuring a scenario-based interface of the application; and Step S1104, displaying, according to the determined interface configuration information, the scenario-based interface of the application.

In some embodiments, the process of collecting information and process of analyzing the collected information may be both executed on the client.

Figure 12:
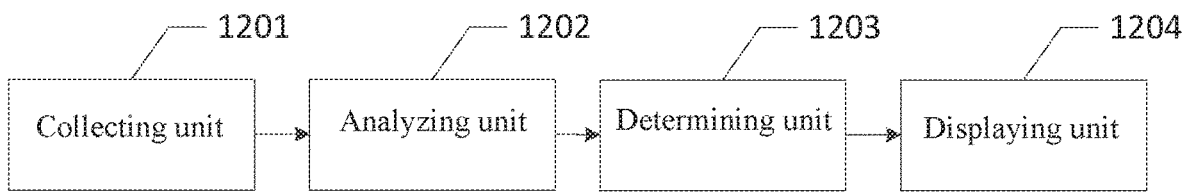
FIG. 12 is a schematic diagram of an apparatus for displaying an application interface according to some embodiments of the application.

Based on the method embodiments, embodiments of the application provide an apparatus for displaying an application interface. FIG. 12 is a schematic diagram of an apparatus for displaying an application interface according to some embodiments of the application. Referring to FIG. 12, the apparatus comprises: a collecting unit 1201 configured to collect information of the user's activities with respect to an application and associated with a trip of the user; an analyzing unit 1202 configured to analyze the collected information to determine a current phase associated with the trip of the user; a determining unit 1203 configured to determine interface configuration information corresponding to the current phase for configuring a scenario-based interface of the application; and a displaying unit 1204 configured to display, according to the determined interface configuration information, the scenario-based interface of the application.

In some embodiments, the apparatus for displaying an application interface may comprise a processor and a non-transitory computer-readable storage medium storing the instructions that, when executed by the processor, cause one or more components of apparatus to perform various steps and methods of the modules described hereinafter.

Although the application is disclosed above with embodiments, these embodiments are not used to limit the application. Without departing from the spirit and scope of the application, any person skilled in the art may make possible variations and modifications. Therefore, the protection scope of the application shall be subject to the scope defined by the claims of the application.

In a typical configuration, a computation device includes one or more processors (CPUs), input/output interfaces, network interfaces, and a memory. A memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the descriptions in the specification, the computer readable media do not include transitory media, such as modulated data signals and carriers.

One of ordinary skill in the art should understand that the embodiments of the application may be provided as a method, a system, or a computer program product. Therefore, the application may be implemented as a complete hardware embodiment, a complete software embodiment, or an embodiment combining software and hardware aspects. Moreover, the application may be in the form of a computer program product implemented on one or more computer usable storage media (including, but not limited to, a magnetic disk memory, CD-ROM, an optical memory, etc.) comprising computer usable program code.

What is claimed is:

1. A computer-implemented method for displaying an application interface, comprising:
    pre-setting a plurality of traveling phases, wherein the plurality of traveling phases include a decision-making phase, a booking phase, and a travel phase;
    collecting information of a user's activities with respect to an application and associated with a trip of the user, wherein the collected information of the user's activities includes log information that includes travel-related application operations performed by the user in the application, user's location information, and order information that includes purchases made by the user in the application;
    determining a current phase associated with the trip of the user based at least on the log information, the user's location information, and the order information, wherein the determining the current phase comprises:
        identifying travel state information of the user according to the collected information,
        comparing the travel state information with the plurality of traveling phases to determine whether the travel state information matches a phase comprised in the plurality of traveling phases; and
        in response to determining that the travel state information matches a phase comprised in the plurality of traveling phases, determining the matched phase to be the current phase associated with the trip of the user;
    determining interface configuration information corresponding to the current phase for configuring a scenario-based interface of an application; and
    sending the determined interface configuration information to a client of the user for the client to display the scenario-based interface of the application to the user according to the determined interface configuration information.

2. The computer-implemented method according to claim 1, wherein, in response to determining that the travel state information does not match any phase comprised in the plurality of traveling phases, sending an instruction of displaying a default interface of the application to the client, causing the application at the client to display the default interface according to the instruction.

3. The computer-implemented method according to claim 1, wherein the identifying travel state information of the user according to the collected information comprises:
    comparing the number of times of executing an operation related to the trip by the user on the application with a threshold value; and
    in response to that the number of times of executing the operation related to the trip by the user on the application exceeds the threshold value, identifying information of the operation as the travel state information of the user.

4. The computer-implemented method according to claim 1, wherein the determining interface configuration information corresponding to the current phase for configuring a scenario-based interface of an application comprises:

setting corresponding interface configuration information of the application for each of the plurality of traveling phases;

establishing a matching relationship between the each of the plurality of traveling phases and the corresponding interface configuration information of the application; and determining, based on the matching relationship, interface configuration information of the application matching the current phase to be the interface configuration information corresponding to the current phase.

5. The computer-implemented method according to claim 4, wherein the interface configuration information comprises interface display configuration information for providing a basis for interface information displayed on the scenario-based interface and interface function configuration information for providing a basis for functional modules that the scenario-based interface has.

6. The computer-implemented method according to claim 4, wherein the establishing a matching relationship between the each of the plurality of traveling phases and the corresponding interface configuration information of the application comprises:

establishing the matching relationship between the each of the plurality of traveling phases and the corresponding interface configuration information by means of a scenario calling engine; and the determining, based on the matching relationship, interface configuration information of the application matching the current phase to be the interface configuration information corresponding to the current phase comprises:

using the scenario calling engine to obtain the matching relationship between the each of the plurality of traveling phases and the corresponding interface configuration information of the application; and determining, according to the matching relationship, interface configuration information of the application matching the current phase.

7. The computer-implemented method according to claim 1, wherein the plurality of traveling phases comprises: before the trip, during the trip, or after the trip; and each of the plurality of traveling phases comprises a plurality of sub-phases.

8. A computer-implemented method for displaying an application interface, comprising:

pre-setting a plurality of traveling phases, wherein the plurality of traveling phases include a decision-making phase, a booking phase, and a travel phase;

collecting information of a user's activities with respect to an application and associated with a trip of the user, wherein the collected information of the user's activities includes log information that includes travel-related application operations performed by the user in the application, user's location information, and order information that includes purchases made by the user in the application;

analyzing the collected information to determine a current phase associated with the trip of the user based at least on the log information, the user's location information, and the order information, wherein the determining the current phase comprises:

identifying travel state information of the user according to the collected information, comparing the travel state information with the plurality of traveling phases to determine whether the travel state information matches a phase comprised in the plurality of traveling phases; and in response to determining that the travel state information matches a phase comprised in the plurality of traveling phases, determining the matched phase to be the current phase associated with the trip of the user;

determining interface configuration information corresponding to the current phase for configuring a scenario-based interface of the application; and displaying, according to the determined interface configuration information, the scenario-based interface of the application.

9. An apparatus for displaying an application interface, comprising: one or more processors and one or more non-transitory computer-readable memories coupled to the one or more processors and configured with instructions executable by the one or more processors to cause the apparatus to perform operations comprising:

pre-setting a plurality of traveling phases, wherein the plurality of traveling phases include a decision-making phase, a booking phase, and a travel phase;

collecting information of a user's activities with respect to an application and associated with a trip of the user, wherein the collected information of the user's activities includes log information that includes travel-related application operations performed by the user in the application, user's location information, and order information that includes purchases made by the user in the application;

determining a current phase associated with the trip of the user based at least on the log information, the user's location information, and the order information, wherein the determining the current phase comprises:

identifying travel state information of the user according to the collected information, comparing the travel state information with the plurality of traveling phases to determine whether the travel state information matches a phase comprised in the plurality of traveling phases; and in response to determining that the travel state information matches a phase comprised in the plurality of traveling phases, determining the matched phase to be the current phase associated with the trip of the user;

determining interface configuration information corresponding to the current phase for configuring a scenario-based interface of an application; and sending the determined interface configuration information to a client of the user for the client to display the scenario-based interface of the application to the user according to the determined interface configuration information.

10. The apparatus according to claim 9, wherein the operations further comprise:

in response to determining that the travel state information does not match any phase comprised in the plurality of the phases, sending an instruction of displaying a default interface of the application to the client, causing the application at the client to display the default interface according to the instruction.

11. The apparatus according to claim 9, wherein the identifying travel state information of the user according to the collected information comprises:

comparing the number of times of executing an operation related to the trip by the user on the application with a threshold value; and in response to that the number of times of executing the operation related to the trip by the user on the application exceeds the threshold value, identifying information of the operation as the travel state information of the user.

12. The apparatus according to claim 9, wherein the determining interface configuration information corresponding to the current phase for configuring a scenario-based interface of an application comprises:
- setting corresponding interface configuration information of the application for each of the plurality of traveling phases;
- establishing a matching relationship between the each of the plurality of traveling phases and the corresponding interface configuration information of the application; and
- determining, based on the matching relationship, interface configuration information of the application matching the current phase to be the interface configuration information corresponding to the current phase.

13. The apparatus according to claim 12, wherein the interface configuration information comprises interface display configuration information for providing a basis for interface information displayed on the scenario-based interface and interface function configuration information for providing a basis for functional modules that the scenario-based interface has.

14. The apparatus according to claim 12, wherein the establishing a matching relationship between the each of the plurality of traveling phases and the corresponding interface configuration information of the application comprises:
- establishing the matching relationship between the each of the plurality of traveling phases and the corresponding interface configuration information by means of a scenario calling engine; and
- the determining, based on the matching relationship, interface configuration information of the application matching the current phase to be the interface configuration information corresponding to the current phase comprises:
- using the scenario calling engine to obtain the matching relationship between the each of the plurality of traveling phases and the corresponding interface configuration information of the application; and
- determining, according to the matching relationship, interface configuration information of the application matching the current phase.

* * * * *